April 14, 1931.  A. ROSEWOOD  1,800,661
WATER FAUCET
Filed May 7, 1928
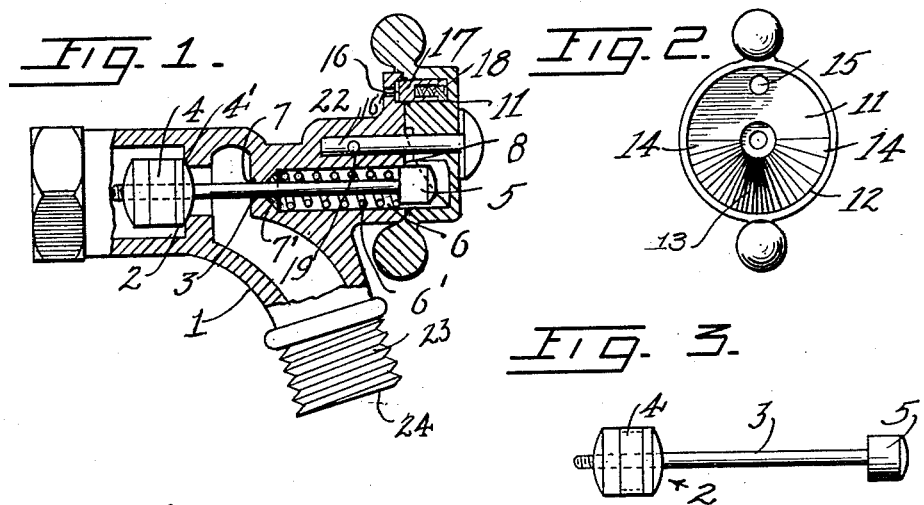
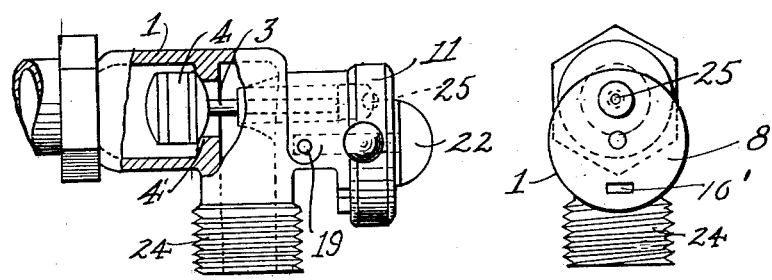
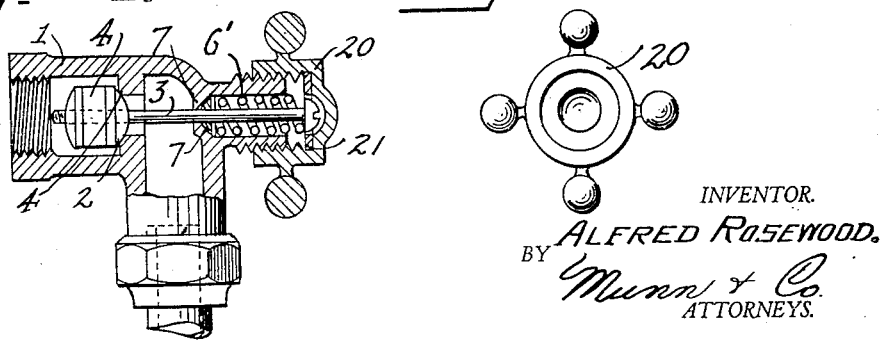
INVENTOR.
ALFRED ROSEWOOD.
BY Munn & Co.
ATTORNEYS.

Patented Apr. 14, 1931

1,800,661

UNITED STATES PATENT OFFICE

ALFRED ROSEWOOD, OF SAN FRANCISCO, CALIFORNIA

WATER FAUCET

Application filed May 7, 1928. Serial No. 275,784.

The object of my invention is to provide a faucet which is simple in construction, durable and responsive in its operation, and so constructed that its washer cannot be injured by any opening or closing movement.

A further object of the invention is to provide a faucet that is particularly adapted for use in gardens or outside of buildings, and so constructed that it has no screws or packing glands or any easily removable parts and is provided with a lock to discourage children from tampering with it.

A further object of the invention is to provide a faucet the valve of which cannot be distorted nor get out of alignment with its seat and which is closed and kept tight by the liquid pressure and which furthermore insures a large flow upon manipulation through a quarter of a turn.

I attain these objects by the novel construction and combination of the several parts as will be shown in the drawings and pointed out in the claims. A further object of this improvement is to provide a faucet for public parks and lawns which is neat in appearance and has no projecting points. These projecting points are a standing menace, especially to children, it being customary to remove the handle wheel on faucets in all public parks for obvious reasons.

I prefer to construct my invention in the following manner but as shown hereafter, it may be modified to suit the various requirements.

Three forms of faucet involving my invention are illustrated in the accompanying drawing.

Figure 1 shows a vertical section through the faucet;

Figure 2 shows an inside view of a manipulating cap;

Figure 3, a side view of a valve used in my device;

Figure 4, a side view of a modified form of faucet, a part being shown in section;

Figure 5, a front view of the faucet with the cap removed;

Figure 6, a vertical section through a further modification of my faucet; and

Figure 7, an inside view of a manipulating cap used in the faucet of Figure 6.

Figure 1 shows a vertical section through my faucet which comprises a housing 1 formed with a valve seat 4' against which seats the valve 2 consisting of a cylindrical stopper of elastic material having its ends rounded and being threaded on a rod 3 which terminates at its other end in a head 5. The stopper is held against distortion by a band 4, and the rod with its head extends into a central bore 6 in which the head is free to slide in and out. At one end the port area of the bore is restricted as shown at 7 to insure an accurate bearing for the rod. A packing 7' is placed where the bore narrows into the restricted section and a spring 6' holds the packing in place. The front end of the faucet terminates in a round flat face 8. The center of this round face is eccentric with the center of the body of the faucet and its valve. The round face 8 is finished to receive a cap 11 Fig. 2, the cap having a turned flange 12 to permit of its smooth rotation. Inside of this cap, is a depression extending substantially through one-half of its area and being deepest at 13 and gradually rising until it merges at 14 into the rest of the surface, which is nearly flush with the flange 12. Diametrically opposite the deepest part 13 of the depression and near the flange 12, the cap is formed with a hole 15 adapted to hold a tumbler 17 and a spring 18, and corresponding recess 16 is formed on the face of the faucet to permit the locking of the cap by the tumbler 17 when so desired. The tumbler 17 is pressed into the recess 16 by the spring 18 and may be removed by insertion of a small pin (not shown) into a small port 16' leading to the recess, whereby the cap is made free to rotate.

It is understood that the thread 23 on the outlet 24 which is used for fastening a hose and the locking device are only desirable on alley, park, and garden faucets.

The cap is held in place by means of a central bolt 22, the head of which does not contain a screw driver slot and which is secured by a pin 19. The latter is difficult to withdraw and tends to discourage mischievous persons from tampering with faucet.

Fig. 4 shows a high duty faucet suitable for public parks and lawns; its cap 11 is in position and held to the body of the faucet by the round-headed bolt 22 which is held by a pin 19. When this faucet is intended for large flow or high pressure, the head of the rod 3 is provided with a steel ball 25 sunk in its head and the cap is filled with lubricant.

The helical spring 6' and packing 7' of Fig. 1 are not shown in Figure 4 and are not essential to the operation or closing of the valve 2 but prevent a small leakage in the bearing 7 when water is drawn.

Fig. 6 shows a section of a simple faucet involving the principle of Fig. 1 with the exception that the cap 20 has an inner thread to engage the male thread cut on the operating end of the faucet; the cap having a gasket 21 to render it free from leakage when the stopper 2 is forced from its seat by the screwing down of the cap. It being a shut-off fixture, it is intended to be mostly kept open and its cap 20 screwed down.

I claim as my invention:

1. In a faucet of the character described, a housing having a valve seat formed therein, an endwise movable valve adapted for engagement with the seat, a cap revolvable on the housing having means for operating the valve when the cap is turned, a bolt extending through the cap into the housing for holding the former in place and a transverse pin extending through the housing and the bolt for locking the latter.

2. In a faucet of the character described, a housing having a valve seat formed therein, an endwise movable valve adapted for engagement with said seat, a cap revolvable on the housing having means for operating the valve when the cap is turned and means for automatically locking the cap against turning motion when the valve is seated.

3. In a faucet of the character described, a housing having a valve seat formed therein, an endwise movable valve adapted for engagement with said seat, a cap revolvable on the housing having means for operating the valve when the cap is turned, a spring pressed tumbler retractably mounted in the cap and a recess formed in the housing adapted to receive said tumbler for locking the cap against turning motion when the valve is seated.

4. In a faucet of the character described, a housing having a valve seat formed therein, an endwise movable valve adapted for engagement with said seat, a cap revolvable on the housing having means for operating the valve when the cap is turned, a spring pressed tumbler retractably mounted in the cap and a recess formed in the housing adapted to receive said tumbler for locking the cap against turning motion when the valve is seated with a perforation in the housing leading to the recess to permit of insertion of a pin for lifting the tumbler out of the recess.

In testimony whereof, I have hereunto set my hand at San Francisco, State of California, this 2nd day of May, 1928.

ALFRED ROSEWOOD.